Figure 1:
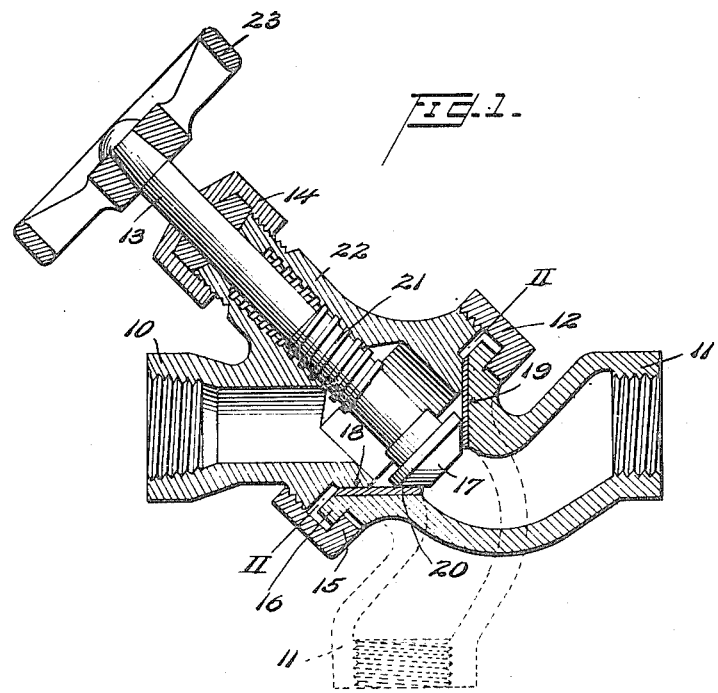

J. O. HOFBERG.
COMBINED VALVE AND PIPE UNION.
APPLICATION FILED JUNE 16, 1921.

1,424,305.

Patented Aug. 1, 1922.

Inventor
J. O. Hofberg

By Herman Jakobsson
Attorney

UNITED STATES PATENT OFFICE.

JOHN OLOF HOFBERG, OF PHILADELPHIA, PENNSYLVANIA, ASSIGNOR OF ONE-HALF TO CHRISTIAN J. STEEN, OF PHILADELPHIA, PENNSYLVANIA.

COMBINED VALVE AND PIPE UNION.

1,424,305.      Specification of Letters Patent.     Patented Aug. 1, 1922.

Application filed June 16, 1921. Serial No. 478,114.

*To all whom it may concern:*

Be it known that I, JOHN OLOF HOFBERG, a citizen of the United States of America, residing at Philadelphia, in the county of Philadelphia and State of Pennsylvania, have invented certain new and useful Improvements in Combined Valves and Pipe Unions, of which the following is a specification.

The present invention relates to a combined valve and pipe union, where the valve is carried in one of the elbows, while its seat is formed in the other elbow. The pipe union is universal, that is to say, it can be used either on a straight pipe line or a line set at an angle similarly to the so-called globe construction of angle valve.

The main object of the invention is to provide a valve in a pipe union with a common seat for the valve and the elbows and in which the seat, where worn, may be immediately renewed without regrinding. It will be evident that such a construction provides many advantages, amongst which may be mentioned: cheapness in manufacture, small cost of up-keep, convenience and ease of renewal after wear and consequent saving of time as the pipe line need not be disturbed during the renewal. A glance at the drawing will convince anybody of its simple construction.

One embodiment of my invention is illustrated in the accompanying drawing in which—

Figure 1 shows a longitudinal section of the combined valve and pipe-union and

Figure 2:
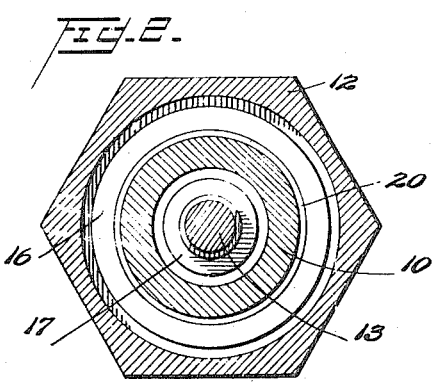

Figure 2 a transverse section along lines II—II of Figure 1.

The union comprises two members 10 and 11 of which 10 forms the valve housing and 11 the union elbow which may be turned in any direction around the axis of the valve housing 10, either to form a straight union as indicated by full lines in Figure 1 or a right angle union as indicated by dot and dash lines or any other desired angle.

A coupling nut 12, engaging with its inward flange 15 a corresponding flange 16 on the elbow, will hold together the two union members 10 and 11 when drawn up tightly on the threads provided on the valve housing 10. A conical socket 19 is provided in the elbow 11 forming a seat for the similarly shaped projection 18 on the valve housing 10. A cone-shaped packing ring 20 having the same taper as the seat 19 and preferably made of soft copper, may be inserted in the socket or seat 19, thus providing a renewable seat. Coupling nut 12 may be substituted by a bolted flange engaging a corresponding flange on member 10.

At an angle to the main or pipe axis of the valve housing member 10 of the union, in the drawing shown about 45°, runs the axis of the valve spindle 13, coinciding with the axis of the conical socket or seat 19. The valve spindle 13 is constructed in the usual manner and provided with threads 21 engaging with corresponding threads in the tubular projection 22 on the housing 10. The usual kind of packing box 14 and a small hand-wheel 23 are also provided.

The head 17 of the valve has the same taper as the packing ring 20, and the seat 19, as will be evident, is common both for the union and for the valve, so that no separate grinding will be required for the union seat and the valve seat, both being done in one continuous operation without resetting during manufacture.

As the copper gasket or packing ring 20 really forms the seat proper, any wear occurring will take place in the same, and all that is needed then is to replace the gasket by a new one. It should be noted that the opening in the flange 15 of the coupling ring 12 must be somewhat larger than the outer end of the elbow 11, so that it may slip over the same in assembling.

I claim:—

1. A combined valve and pipe union, comprising two main members, one of said members providing a valve housing, the axis of said housing being set at an oblique angle to the main axis of the union, a valve spindle having suitable engagement in the housing for advancement and retraction, a cone-shaped head on the spindle, the second member being provided with a socket and the first member with a projection both having the same taper as said head, and means for drawing the two members together to form a tight joint with said projection engaging said socket which forms a seat for the valve head.

2. A combined valve and pipe union, comprising two main members, one of said members providing a valve housing, the axis of said housing being set at an oblique angle to the main axis of the union, a valve spindle having suitable engagement in the housing for advancement and retraction, a cone-shaped head on the spindle, the second member being provided with a socket and the first member with a projection both having the same taper as said head, a cone-shaped packing ring of the same taper as said head inserted in said socket and forming a seat both for said projection and said valve head, and means for drawing the two members together to form a tight joint.

3. In a combined valve and pipe union comprising two pipe connecting members, a coupling member for said members and a tapered valve housed in one of said pipe connecting members, the axis of the valve being set at an angle to the main pipe axis of the last mentioned connecting member, a removable seat provided in the other of said connecting members, said seat being common for both the valve and the connecting member in which the valve is housed and having the same taper as the valve.

4. In a combined valve and pipe union comprising two pipe connecting members, a coupling member for said members and a valve housed in the first of said pipe connecting members, the axis of the valve being set at an angle to the main pipe axis of said first connecting member, a removable seat of comparatively soft material provided in the second of said connecting members, said seat being common for both the valve and the first connecting member, the interengaging surfaces of said valve, seat and first connecting member being conical.

In testimony whereof I affix my signature.

JOHN OLOF HOFBERG.